JAMES W. MILROY, OF GALVESTON, INDIANA, ASSIGNOR TO HIMSELF AND S. B. SHANER, OF XENIA. OHIO.

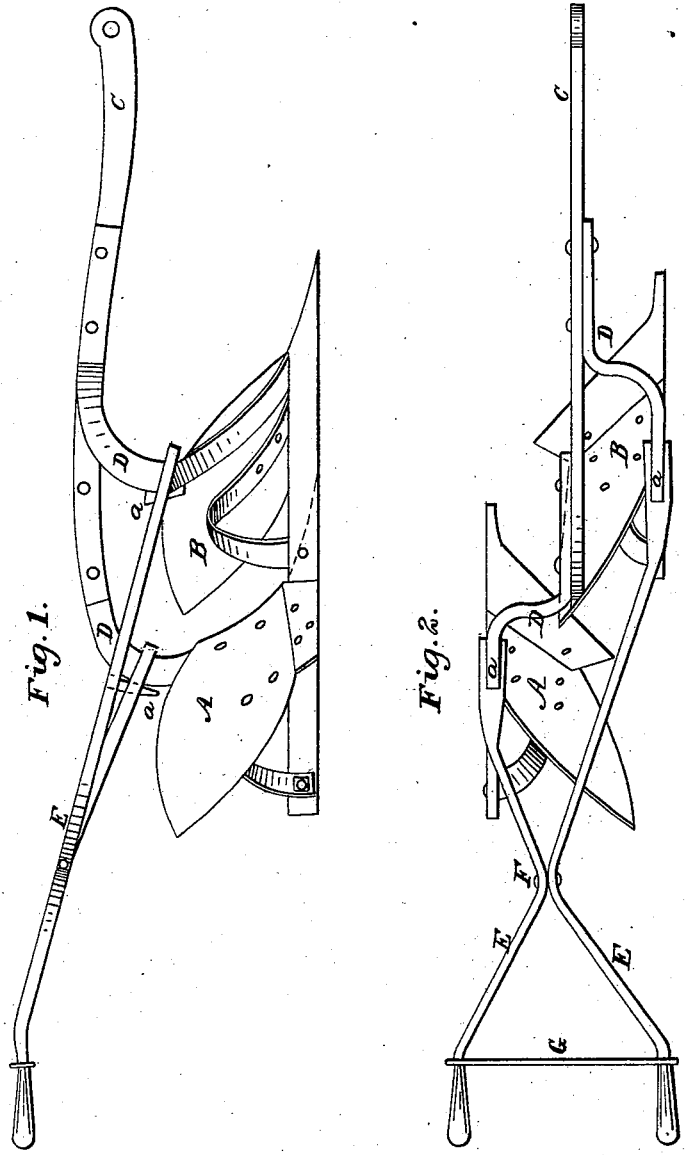

Letters Patent No. 85,324, dated December 29, 1868.

IMPROVEMENT IN CORN AND COTTON-PLOW.

The Schedule referred to in these Letters Patent and making part of the same.

*To all whom it may concern:*

Be it known that I, JAMES W. MILROY, of Galveston, in the county of Cass, and State of Indiana, have invented a new and useful Improvement in Corn and Cotton-Plows; and I do hereby declare that the following is a full, clear, and exact description of the construction and operation of the same, reference being had to the accompanying drawings, making a part of this specification, in which—

Figure 1 is a side elevation.

Figure 2 is a plan or top view.

Like letters in both figures of the drawings indicate like parts.

The nature of my invention consists in the combination of a right with a left mould-board plow, so as to form one double right-and-left plow, the two being so arranged, one in front of the other, as to run nearly in the same track, the front plow running near the row, and throwing the dirt from it, while the rear plow throws the fresh fine dirt back to the row of corn or cotton.

To enable others skilled in the art to make and use my invention, I will proceed to describe its construction and operation.

I construct, in the usual manner, the right and left mould-board plows, A B, and attach them to one and the same beam C, by means of rivets, or with screw-bolts with nuts, through the standards or projecting arms thereof, D D, the forward plow being thus attached about the middle of the beam C, and the rear plow at the back end of said beam.

The handles E E are made, so as to slide over the standards, and are secured thereto, in any required position, by the keys *a a*, and are bent so as to meet, and are fastened in the middle by the bolt or rivet F, being braced near the ends by the rod G. The relative positions of the two plows may be varied as required.

Operation.

The bar of the forward plow is run as near the row as the safety of the growing corn, cotton, or other growth will allow, and the dry clods, hard crust, weeds, grass, or other rubbish which may be near, are removed and turned under, while the rear plow throws back to the row the fresh, fine dirt which has been turned up by the front plow, and at the same time the ground is thus thoroughly stirred and pulverized.

Claim.

Having thus thoroughly described my invention,

What I claim therein as new, and desire to secure by Letters Patent, is—

The combination of the right and left mould-board-plows A and B, substantially in the manner and for the purpose as herein described.

JAMES W. MILROY.

Witnesses:
 WILLIAM R. LAMB,
 THORNBURY BALDWIN.